United States Patent
Sims et al.

(10) Patent No.: US 11,895,133 B2
(45) Date of Patent: Feb. 6, 2024

(54) SYSTEMS AND METHODS FOR AUTOMATED DEVICE ACTIVITY ANALYSIS

(71) Applicant: BANK OF AMERICA CORPORATION, Charlotte, NC (US)

(72) Inventors: Scott Anderson Sims, Tega Cay, SC (US); Jeffrey Brian Bashore, Saint Augustine, FL (US); Michael Joseph Carroll, Orland Park, IL (US); Christopher J. Cooley, Longmont, CO (US); Andrew DongHo Kim, Glendale, AZ (US); Pavan Kumar Reddy Kotlo, Middletown, DE (US); Randy J. Nelson, Chicago, IL (US); Jennifer Quillen, Newark, DE (US); Lizabeth Rosenberg, Chicago, IL (US); Dharmender Kumar Satija, Rye Brook, NY (US); James F. Stevens, Chicago, IL (US); Craig Douglas Widmann, Chandler, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 198 days.

(21) Appl. No.: 17/222,440

(22) Filed: Apr. 5, 2021

(65) Prior Publication Data
US 2022/0321586 A1    Oct. 6, 2022

(51) Int. Cl.
H04L 29/06        (2006.01)
H04L 9/40         (2022.01)

(52) U.S. Cl.
CPC ............................... *H04L 63/1425* (2013.01)

(58) Field of Classification Search
CPC .................................................. H04L 63/1425
See application file for complete search history.

(56) References Cited

U.S. PATENT DOCUMENTS

| | | |
|---|---|---|
| 9,081,638 B2 | 7/2015 | Motta et al. |
| 9,167,550 B2 | 10/2015 | Mahaffey et al. |
| 9,473,537 B2 | 10/2016 | Sinha et al. |
| 9,569,643 B2 | 2/2017 | Grkov et al. |
| 9,807,600 B2 | 10/2017 | Freedman et al. |
| 9,825,996 B2 | 11/2017 | Brannon et al. |
| 9,838,398 B2 | 12/2017 | Barton et al. |
| 9,858,428 B2 | 1/2018 | Barton et al. |
| 9,917,698 B2 | 3/2018 | Broch |
| 10,075,461 B2 * | 9/2018 | Mumcuoglu ....... H04L 63/1441 |

(Continued)

*Primary Examiner* — John B King
(74) *Attorney, Agent, or Firm* — Moore & Van Allen PLLC; Nicholas C. Russell

(57) ABSTRACT

Embodiments of the present invention provide an innovative system, method, and computer program product for automated device activity analysis in both a forward and reverse fashion. A collaborative system for receiving data and continuously analyzing the data to determine emerging patterns associated with particular user devices is provided. The system is also designed to generate a historical query of user device touch points or interaction points with entity systems across multiple data vectors, and generate system alerts as patterns or potential issues are identified. Common characteristics of data may be used to detect patterns that are broadened in scope and used in a generative neural network approach.

20 Claims, 5 Drawing Sheets

(56) References Cited

U.S. PATENT DOCUMENTS

| | | |
|---|---|---|
| 10,091,127 B2 | 10/2018 | Chang et al. |
| 10,102,056 B1 * | 10/2018 | Goldberg ............ G06F 9/45558 |
| 10,305,862 B2 | 5/2019 | Bone |
| 10,372,439 B2 | 8/2019 | Lewis et al. |
| 10,469,534 B2 | 11/2019 | Qureshi et al. |
| 10,470,148 B2 | 11/2019 | Stricklen et al. |
| 10,484,867 B2 | 11/2019 | Amundsen et al. |
| 10,581,886 B1 * | 3/2020 | Sharifi Mehr ...... H04L 63/1441 |
| 10,609,560 B2 | 3/2020 | Mistry et al. |
| 10,749,907 B2 | 8/2020 | Sinha et al. |
| 10,951,507 B1 | 3/2021 | Slavin |
| 11,037,173 B1 * | 6/2021 | Gurnov ............. G06Q 30/0185 |
| 2015/0180894 A1 * | 6/2015 | Sadovsky ............ H04W 12/12 726/22 |
| 2016/0307191 A1 * | 10/2016 | Turgeman ............. G06F 21/316 |
| 2017/0244626 A1 | 8/2017 | Karren et al. |
| 2019/0373007 A1 * | 12/2019 | Salunke ............. G06F 11/3423 |
| 2020/0351174 A1 | 11/2020 | Frost |
| 2021/0036867 A1 * | 2/2021 | Attard .................... G06F 21/64 |
| 2021/0067533 A1 * | 3/2021 | Zhou ....................... H04L 69/22 |
| 2022/0107813 A1 * | 4/2022 | Lu ......................... G06F 9/3836 |
| 2022/0123552 A1 * | 4/2022 | Pathak .................... H02H 7/26 |
| 2022/0269577 A1 * | 8/2022 | Gechman ............ G06F 11/3409 |

\* cited by examiner

SYSTEMS AND METHODS FOR AUTOMATED DEVICE ACTIVITY ANALYSIS

FIELD OF THE INVENTION

The present invention is generally related to systems and methods for providing an improved device inventory system for entity wide data analysis and device activity tracking.

BACKGROUND

Given the advent and increasing use of mobile device management solutions in entity contexts, it is important for entities to account for device usage and permissions in order to inventory device activity on a network for security purposes. Additionally, in the context of entity platforms that provide customer access and remote access solutions, entities are presented with unique challenges with validating user identities and correlating such identities with user device identifiers. Such correlation can aid in the analysis of user activity or interaction with entity software, platforms, and systems. In cases where an entity becomes aware of malfeasant activity associated with a particular user device, it may be prudent to place increased attention on the particular device's activity patterns in order to increase security of the entity network and systems. There is a need for an enhanced solution for device identification and use-pattern recognition with the capability to not only increase device monitoring in a forward-looking fashion, but also analyze previous device activity for identification of potential issues.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for automated device activity analysis in both a forward and reverse fashion. A collaborative system for receiving data and continuously analyzing the data to determine emerging patterns associated with particular user devices is provided. The system is also designed to generate a historical query of user device touch points or interaction points with entity systems across multiple data vectors, and generate system alerts as patterns or potential issues are identified. Common characteristics of data may be used to detect patterns that are broadened in scope and used in a generative neural network approach. The system and methods generally comprise: identifying a data anomaly associated with a specific user device and specific resource account; retrieving historical interaction data from one or more entity or third party systems; based on the historical interaction data, identifying one or more interactions involving the specific user device; determining if the one or more interactions involving the specific user device is malfeasant activity; identifying one or more resource accounts or users affected by the malfeasant activity.

In some embodiments, the invention further comprises generating a report file, wherein the report files comprises identified malfeasant activity and affected accounts or users.

In some embodiments, the invention further comprises transmitting an alert to one or more users or administrators, wherein the alert contains the report file.

In some embodiments, the invention further comprises initiating automated restriction of access to the entity or third party systems by the specific user device.

In some embodiments, identifying the data anomaly associated with the specific user device and the specific resource account further comprises: receiving transaction data and user device data from one or more entity or third party systems; identifying one or more unique user devices from the device data; generating baseline transaction and device pattern data and appending a resource account identifier value to the baseline transaction and device pattern data; receiving additional transaction data and additional user device data; comparing the additional transaction data and additional user device data to the baseline transaction and device pattern data; based on comparing the additional transaction data and additional user device data to the baseline transaction and device pattern data, identifying one or more new user devices, and label the one or more new user devices as the data anomaly.

In some embodiments, the baseline transaction and device pattern data further comprises volume and frequency of interactions between one or more user devices and resource accounts.

In some embodiments, the one or more new user devices are identified as accessing one or more resource accounts for the first time.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
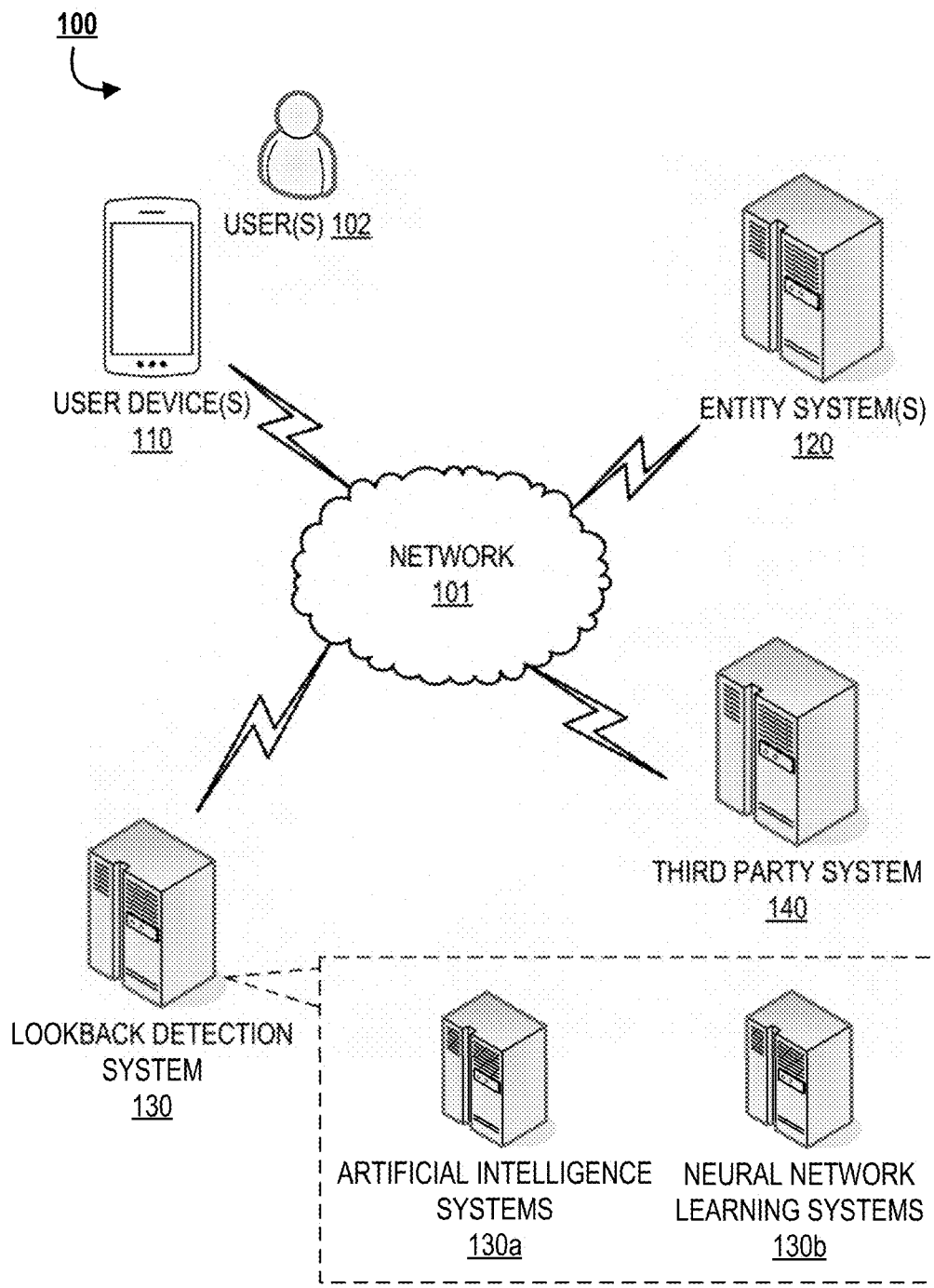
Figure 2:
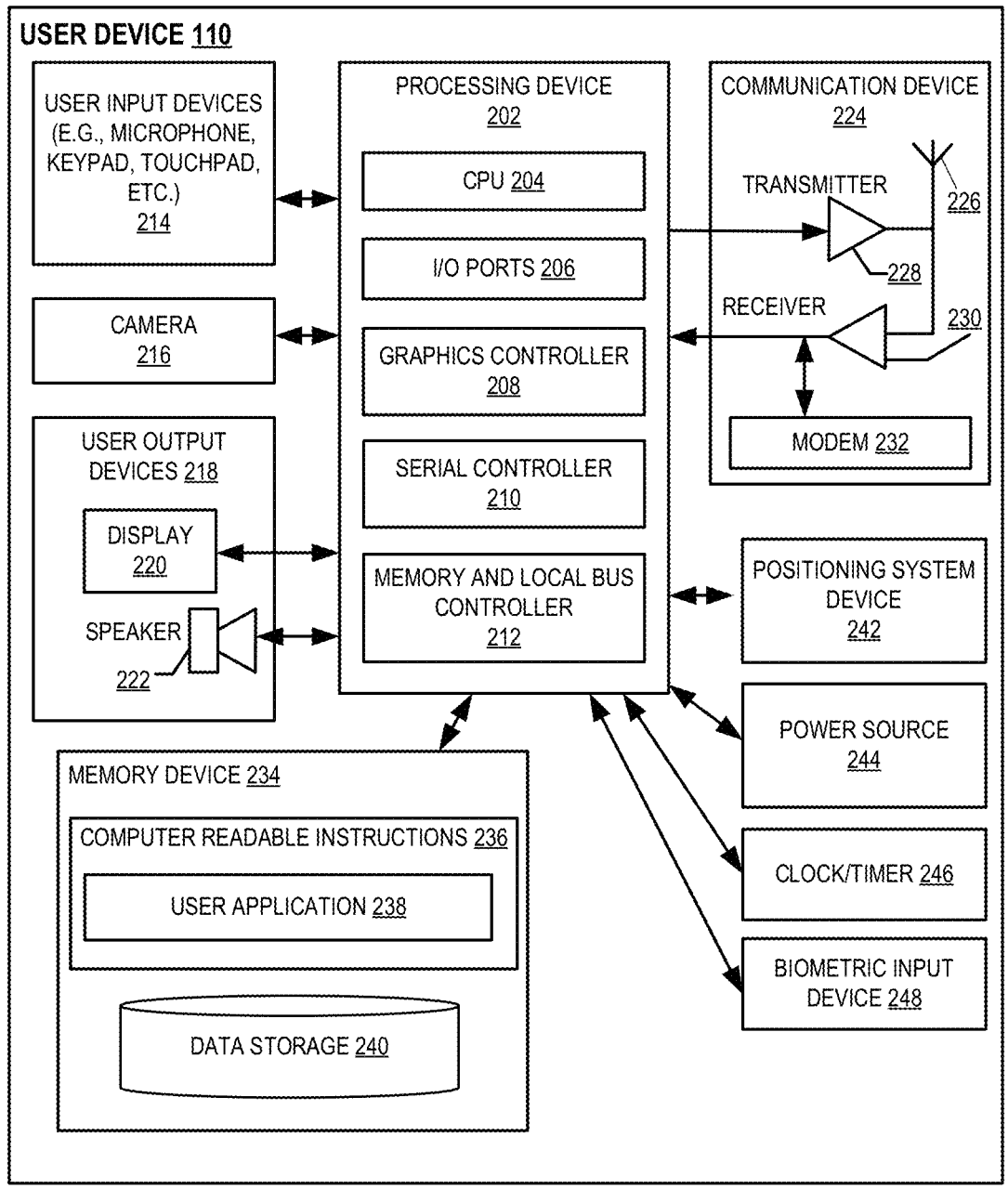
Figure 3:
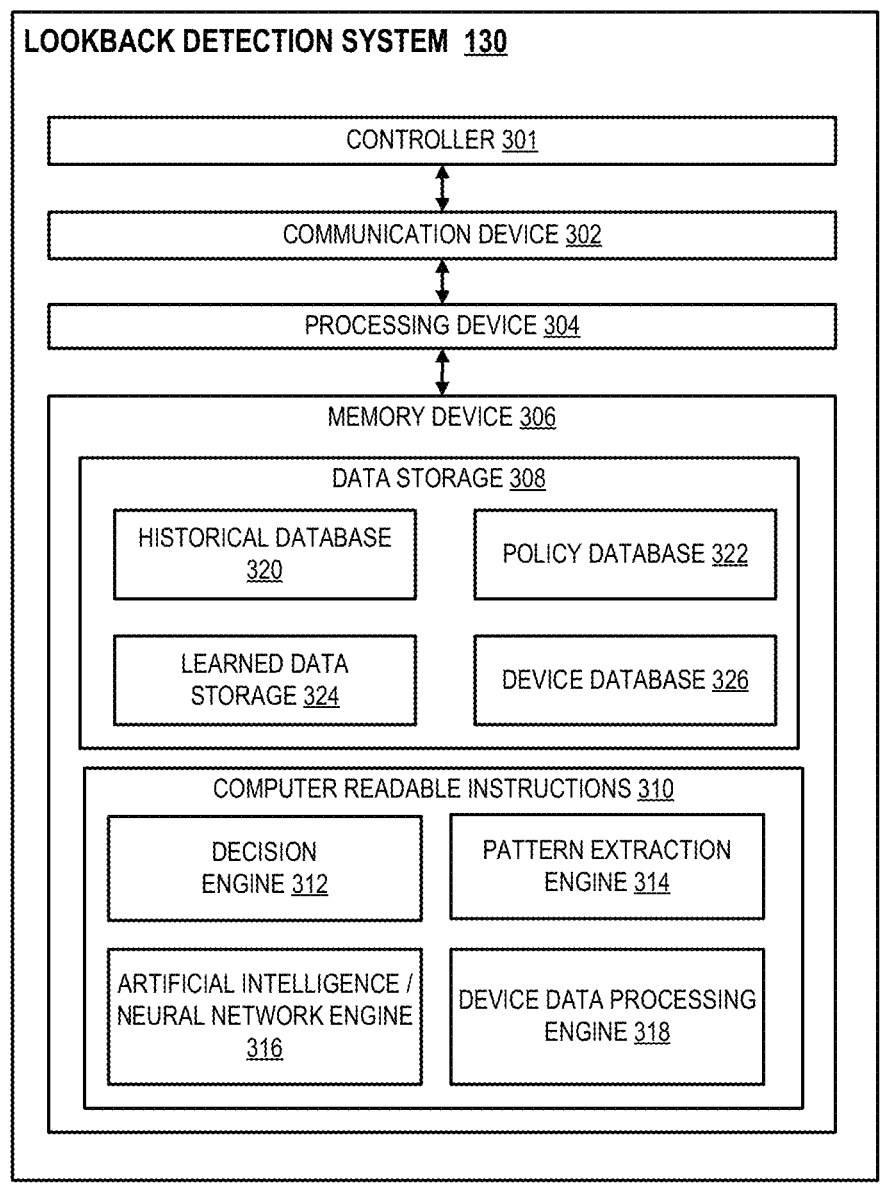
Figure 4:
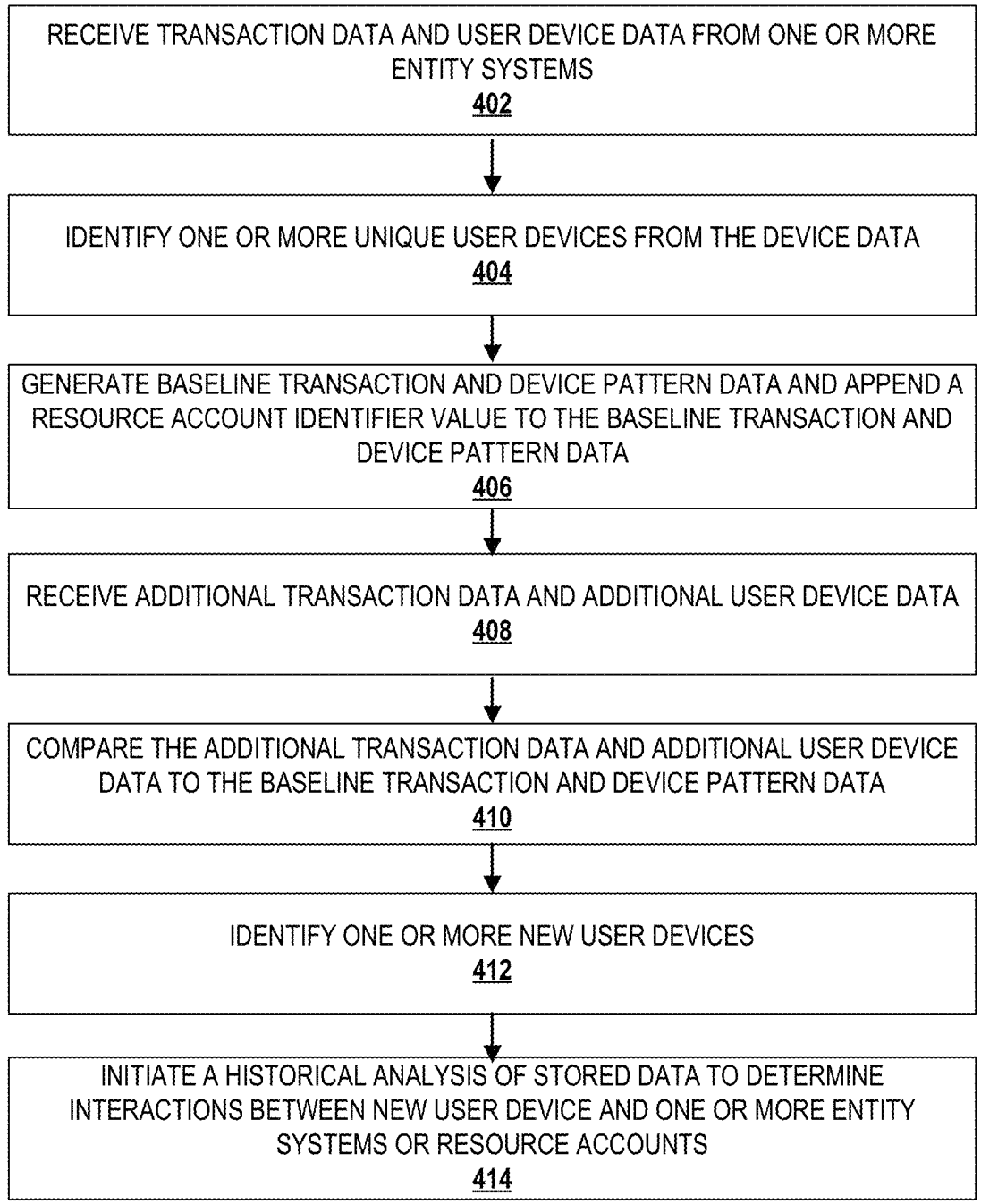
Figure 5:
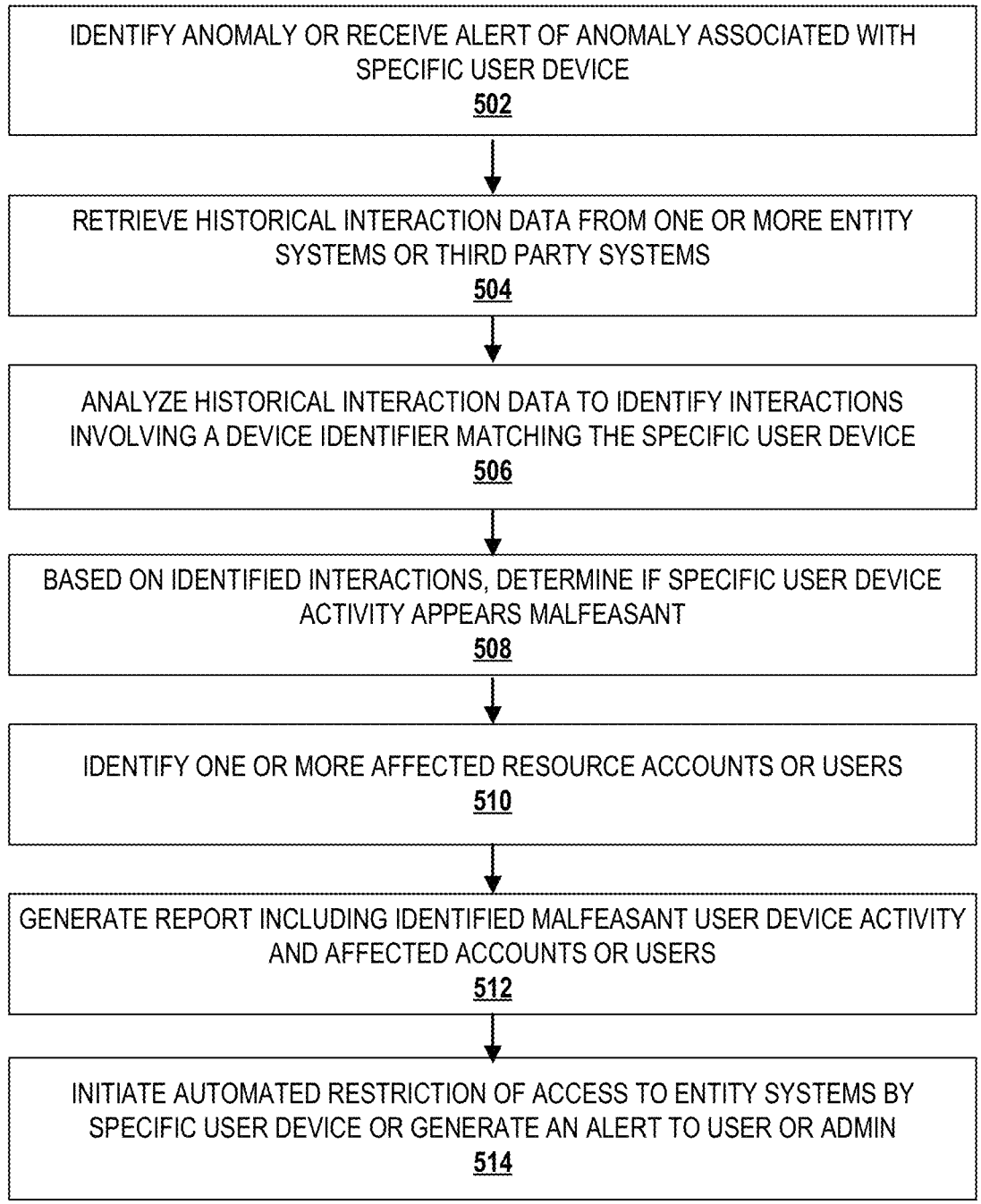

Having thus described embodiments of the invention in general terms, reference will now be made to the accompanying drawings, wherein:

FIG. 1 provides a system environment 100, in accordance with one embodiment of the invention;

FIG. 2 provides a block diagram of the user device 110, in accordance with one embodiment of the invention;

FIG. 3 provides a block diagram of the lookback detection system 130, in accordance with one embodiment of the invention;

FIG. 4 provides a high level process flow for data processing and anomaly identification, in accordance with one embodiment of the invention; and FIG. 5 provides a high level process flow for data processing, historical analysis, and response, in accordance with one embodiment of the invention.

DETAILED DESCRIPTION OF EMBODIMENTS OF THE INVENTION

Embodiments of the system, as described herein leverage artificial intelligence, machine-learning, and/or other complex, specific-use computer systems to provide a novel approach for automated device activity analysis in both a forward and reverse fashion. A collaborative system for receiving data and continuously analyzing the data to determine emerging patterns associated with particular user devices is provided. The system is also designed to generate a historical query of user device touch points or interaction points with entity systems across multiple data vectors, and generate system alerts as patterns or potential issues are identified. Common characteristics of data may be used to detect patterns that are broadened in scope and used in a generative neural network approach.

Systems and methods of authentication and malfeasant activity detection for high-security applications increasingly rely on the gathering and analysis of user device data in order to identify emergent patterns in user device behavior. This type of analysis of user device interaction history is particularly important in the context of financial services, wherein a user device may be authorized to interact with or change certain resource accounts, or initiate transactions, transfers, withdrawals, or the like. Patterns in transaction history and resource movement may indicate potential malfeasant activity. For instance, a specific device may be used to access a particular resource account which is typically only accessed via one or more other user devices. This may warrant increased monitoring of the specific user device's activity in order to quickly identify any resource transactions, transfers, withdrawals, or the like that appear out of the ordinary based on the resource account history.

While various systems exist for increased monitoring of user devices in a forward-looking manner, for instance, actively monitoring a specific user device for malfeasant activity going forward from the point of identification of the specific user device, the present invention provides the unique capability to perform historical analysis of entity and network data in order to determine previous interactions, or "touch points" with entity systems wherein the specific user device was used. This allows the entity to identity user device activity patterns which can additionally inform the entity or system of potential malfeasant activity. For instance, the system may recognize that the specific user device accessed more than one account for the first time in a specific time period, indicating that the user device may represent a pattern of unauthorized account access. In such instances, the system may also employ the use of prophylactic measures to block or restrict the specific user device's ability to initiate transactions, or the like, or may alert system users or administrators of the identified use pattern of the specific device.

In addition, where specific data on user identify may be unavailable, inaccessible, or blocked for use according to specific user permissions, the system may use an aggregate data method in order to determine a statistical feasibility or likelihood that a certain account or device activity is either authentic and verified, or malfeasant. For instance, the system may analyze and record the number of unique devices which typically interact with one or more accounts, and may form a baseline for typical volume of resource activity (e.g., amount of currency withdrawn, transacted, deposited, transferred, or the like), across a given number of accounts during a given time period. In other embodiments, a baseline for typical account access frequency may be identified (e.g., number of times the account is accessed, or transacted with, or the like), during a given time period. By comparing the frequency or volume of account activity for one account or between similar accounts, during any given time period, the system may form a baseline for comparison to new device interaction and account activity going forward. In this way, the system is able to categorize and discern between normal and anomalous account behavior, and correlate this with user device identification characteristics, in order to inform a determination as to potential malfeasant activity, without the need for specific user identity verification. In some embodiments where the system has identified the frequency or volume of account activity as anomalous, the system may initiate a remedial or protective measure, such as blocking or restricting user device access to one or more accounts, may attempt to gather more information on one or more user devices associated with the anomalous activity, or may generate an alert to one or more users or administrators for further action and review.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user" may refer to any entity or individual associated with the system or entity, or whom may be a customer of the system or entity. In some embodiments, a user may be a computing device user, a phone user, a mobile device application user, a customer of an entity or business, a system operator, and/or employee of an entity (e.g., a financial institution). In a specific embodiment, a user may be a managing user of a machine learning model, wherein the system enables the user to reconfigure the model based on user-specified criteria and policies. In another specific embodiment, a user may be a customer accessing a user account via an associated user device, wherein data from an interaction between the user and an entity is analyzed or processed by the system. In some embodiments, identities of an individual may include online handles, account numbers, usernames, identification numbers (e.g., Internet protocol (IP) addresses), aliases, family names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, entertainment devices, or any combination of the aforementioned. The device may be used by the user to access the system directly or through an application, online portal, internet browser, virtual private network, or other connection channel.

As used herein, the term "entity" may be used to include any organization or collection of users that may interact with the geolocation security system. An entity may refer to a business, company, or other organization that either maintains or operates the system or requests use and accesses the system. In one embodiment, the entity may be a software development entity or data management entity. In a specific embodiment, the entity may be a cybersecurity entity or misappropriation prevention entity. In other specific embodiments, the entity may be a "financial institution" or "financial entity" and may include any organization that processes financial transactions including, but not limited to, banks, credit unions, savings and loan associations, investment companies, stock brokerages, insurance companies or the like. In other embodiments, an entity may be a business, organization, a government organization or the like that is not a financial institution. Particularly with respect to the embodiments depicted in FIGS. 1 through 5, the term entity may refer to the entity which manages or administers the development and use of the geolocation security system. As used herein, the term "third party" may be an entity, person, or group, other than the entity that manages the geolocation security system, but may interface with the geolocation security system by providing data, leveraging the capabilities of the geolocation security system, or the like.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, or the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise continuously monitoring a data stream provided by an imaging device or biometric measurement device in order to analyze changes in the images over time or observe changes in certain objects in different environments.

As used herein, an "interaction" or "account activity" may refer to any action or communication between users, entities, or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface (e.g., clicking, swiping, text or data entry, or the like), authentication actions (e.g., signing-in, username and password entry, PIN entry, or the like), biometric authentication actions (e.g., providing a finger print, facial recognition sample, voice sample, or the like), account actions (e.g., account access, fund transfers, or the like) or the like. In another example, an interaction may refer to a user communication via one or more channels (i.e., phone, email, text, instant messaging, brick-and-mortar interaction, or the like) with an entity and/or entity system to complete an operation or perform an action with an account associated with user and/or the entity. A subset of interactions may be referred to herein as "resource actions," which refers to any interaction in which the flow of resources or funds to or from a user resource account may occur. In some embodiments, the lookback detection system 130 may be used to authenticate a resource action (e.g., authenticate the transfer of funds, access to resource account balances, or the like). As used herein, "resources" may refer to currency, money, funds, or the like which may be stored or managed in an account or "resource account," such as a savings account, checking account, credit account, corporate account, or the like. In some embodiments, the resource account may be stored and managed by one or more entity systems or third party systems. "Resource account identifiers" may be used to monitor activity associated with resource accounts, and may include routing numbers, account numbers, pin codes, transaction identification numbers, user names, entity names, geographic regions, or the like.

FIG. 1 provides a system environment 100, in accordance with one embodiment of the invention. As illustrated in FIG. 1, lookback detection system 130 is operatively coupled, via a network 101, to the user device(s) 110 (e.g., a mobile phone, computer, laptop, tablet, terminal, automated teller machine or "ATM", wearable device, or the like), third party system 140, and entity system(s) 120. While only one third party system 140 is depicted in the embodiment shown in FIG. 1, it is understood that the network 101 may interconnect lookback detection system 130, entity system 120, and user device 110 with multiple third party systems 140. In this way, the lookback detection system 130 can send information to and receive information from the user device 110, the third party system(s) 140, and the entity system 120. In the illustrated embodiment, the plurality of user devices 110 and systems such as entity system 120 and third party system 140 provide a plurality of communication channels through which the entity system 120, third party system 140, and/or the lookback detection system 130 may communicate over the network 101. In the illustrated embodiment, the lookback detection system 130 further comprises an artificial intelligence (AI) system 130a and a machine learning system 130b which may be separate systems operating together with the lookback detection system 130 or integrated within the lookback detection system 130.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein. Non-limiting examples of applications in which the system described herein may be incorporated include cybersecurity, misappropriation detection, autonomous device usage or monitoring (e.g., monitoring of intelligent ATM devices, or the like), AI assistants, or the like. In some embodiments, interactions performed between the user device(s) 110 and the third party entity system 120 are intercepted and received by the lookback detection system 130, wherein interaction data may be extracted from an interaction over the network 101 by the lookback detection system 130 for analysis. Data monitored and/or extracted by the system may include, in a non-limiting example, user information, communication history, transaction history, or the like. Data, such as user interaction data, may be acquired from across communication channels of an entity such as phone lines, text messaging systems, email, applications (e.g., mobile applications), websites, automated teller machines (ATMs), card readers, call centers, electronic assistants, instant messaging systems, interactive voice response (IVR) systems, brick-and-mortar locations or the like.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with the entity system 120 via a user device 110 while a data flow or data stream between the user device 110 and the entity system 120 is monitored by or received by the lookback detection system 130 over the network 101 to be processed or analyzed. In some embodiments a user 102 is a user requesting service from the entity (e.g., customer service) or interacting with an account maintained by the entity system 120 in order to initiate or authenticate a resource action. In an alternative embodiment, the user 102 is a user interacting with, maintaining, or employing the lookback detection system 130, wherein the system enables the user to reconfigure the model based on user-specified criteria and policies.

In some embodiments, the lookback detection system 130 receives data from one or more of the user devices 110, entity systems 120, or third party system 140, and analyzes the received data in order to compare user activity with resource account activity. In this way, the lookback detection system 130 may identify instances where user activity does not match or appears to be in conflict with a baseline of observed typical resource account activity based on historical data. For example, in some embodiments, the lookback detection system 130 may recognize that a specific user device 110 accessed more than one resource account (or "account") for the first time in a specific time period, indicating that the user device may represent a pattern of unauthorized account access. In such instances, the lookback detection system 130 may also employ the use of prophylactic measures to block or restrict the specific user device's ability to initiate transactions, or the like, or may alert system users or administrators of the identified use pattern of the specific device.

In addition, where specific data on user identify may be unavailable, inaccessible, or blocked for use according to specific user permissions, the lookback detection system 130 may use an aggregate data method in order to determine a statistical feasibility or likelihood that a certain account or device activity is either authentic and verified, or malfeasant. For instance, the lookback detection system 130 may analyze and record the number of unique devices which typically interact with one or more accounts, and may form a baseline for typical volume of resource activity (e.g., amount of currency withdrawn, transacted, deposited, transferred, or the like), across a given number of accounts during a given time period. In other embodiments, a baseline for typical account access frequency may be identified (e.g., number of times the account is accessed, or transacted with, or the like), during a given time period. By comparing the frequency or volume of account activity for one account or between similar accounts, during any given time period, the lookback detection system 130 may form a baseline for comparison to new device interaction and account activity going forward. In this way, the lookback detection system 130 is able to categorize and discern between normal and anomalous account behavior, and correlate this with user device identification characteristics, in order to inform a determination as to potential malfeasant activity, without the need for specific user identity verification. In some embodiments where the system has identified the frequency or volume of account activity as anomalous, the lookback detection system 130 may initiate a remedial or protective measure, such as blocking or restricting user device access to one or more accounts, may attempt to gather more information on one or more user devices associated with the anomalous activity, or may generate an alert to one or more users or administrators for further action and review.

It is understood that user device activity in comparison to baseline activity may be analyzed in a number of ways, which may be dynamically changed based on each resource account in question. For instance, each particular resource account may have a different frequency or volume of transactions or resources which are typically associated with that resource account, and the lookback detection system 130 may be required to generate a unique baseline for each resource account. In other embodiments, "normal" account activity or access may be based on a threshold programmed by an administrator of the system, or may intelligently be identified by the lookback detection system 130 according to a statistically significant deviation with respect to a baseline of historical data of one or more similar accounts (e.g., historical data may indicate that a given threshold of discrepancy between number N of volume or number N of volume may be expected in a given length of time, but a standard of deviation or threshold amount difference may trigger an alert, or the like). In any instance, the system may generate an alert or initiate a remedial action if an identified discrepancy meets some programmed threshold or intelligently defined statistical deviation from the norm based on historical data collected.

FIG. 2 provides a block diagram of the user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, or the like), a communication device or network interface device 224, a power source 244, a clock or other timer 246, a visual capture device such as a camera 216, a positioning system device 242 (e.g., a geo-positioning system device like a GPS device with an included accelerometer, or the like), and a biometric input device (e.g., a finger print reader or the like). The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems, such as the entity system 120, third party system 140, or lookback detection system 130. In one embodiment, the user 102 is a maintaining entity of a lookback detection system 130, wherein the user application enables the user 102 to define policies and reconfigure the lookback detection system 130. In other embodiments, the user 102 may be a customer of the entity or the third party that is interacting with the lookback detection system 130 or entity system(s) 120 in order to provide authentication data or complete a resource account activity. In one embodiment, the user 102 is a customer of a financial entity and the user application 238 is an online banking application providing access to the entity system 120 wherein the user may interact with a user account via a user interface of the user application 238, wherein the user interactions may be provided in a data stream as an input. In some embodiments, the user 102 may opt in to share data from the user device 110 with the lookback detection system 130. As such, the user may share various location data, biometric data, or the like, authenticating both the user's identity and location at specific times. Additionally, in some embodiments, the user may opt in to share such data for the purposes of correlation with biometric or identity verification data collected via other devices, such as devices at an entity location (e.g., cameras, infrared scanners, wireless network devices, or the like, located at an entity location, such as a branch location). In some embodiments, the user may not opt-in to share specific information with the lookback detection system 130, in which case the lookback detection system 130 or entity system 120 may only be able to gather a device identifier (ID) such as an Internet Protocol (IP) address, media access control address (MAC address), or the like, during interaction between the user device 110 and one or more systems over the network. The device identifier may be used by the lookback detection system 130 in order to analyze user device activity with various systems, such interactions being regarded as "touchpoints."

The processing device 202 may be configured to use the communication device 224 to communicate with one or more other devices on a network 101 such as, but not limited to the entity system 120 and the lookback detection system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network or the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance with audio frequency, ultrasound frequency, infrared frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 120 (as illustrated in FIG. 1) which is connected to the user device 110 and the lookback detection system 130 and which may be associated with one or more entities, institutions, brick and mortar locations, or the like. In this way, while only one entity system 120 is illustrated in FIG. 1, it is understood that multiple networked systems may make up the system environment 100. The entity system 120 generally comprises a communication device, a processing device, and a memory device. The entity system 120 comprises computer-readable instructions stored in the memory device, which in one embodiment includes the computer-readable instructions of an entity application. The entity system 120 may communicate with the user device 110 and the lookback detection system 130 to provide access to user accounts stored and maintained on the entity system 120. In some embodiments, the entity system 120 may communicate with the lookback detection system 130 during an interaction with a user 102 in real-time, wherein user interactions may be monitored and processed by the lookback detection system 130 in order to analyze interactions with the user 102 and reconfigure the neural network model in response to changes in a received or monitored data stream. In one embodiment, the system is configured to receive data for decisioning, wherein the received data is processed and analyzed by the lookback detection system 130 to determine a decision for verification of a user identity.

FIG. 3 provides a block diagram of the lookback detection system 130, in accordance with one embodiment of the invention. The lookback detection system 130 generally comprises a controller 301, a communication device 302, a processing device 304, and a memory device 306. As used herein, the term "controller" generally refers to a hardware device and/or software program that controls and manages the various systems described herein such as the user device 110, the entity system 120, and/or the lookback detection system 130, in order to interface and manage data flow between systems while executing commands to control the systems. In some embodiments, the controller may be integrated into one or more of the systems described herein. In some embodiments, the controller may perform one or more of the processes, actions, or commands described herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device. The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the lookback detection system 130 comprises computer-readable instructions 310 stored in the memory device 306, which in one embodiment includes the computer-readable instructions 310 of a decision engine 312, a pattern extraction engine 314, a pattern extraction engine 314, an artificial intelligence and neural network engine 316, and an device data processing engine 318. In one embodiment, the artificial intelligence and neural network engine 316 may be utilized by the decision engine 312, pattern extraction engine 314, and/or device data processing engine 318 to analyze received device data, account data, transaction data, resource activity data, and user data in order to identify relevant patterns and that can be used to discern between unique users and identify anomalies In some embodiments, the memory device 306 includes data storage 308 for storing data related to the system environment, but not limited to data created and/or used by the decision engine 312, pattern extraction engine 314, device data processing engine 318, and artificial intelligence and neural network engine 316. Storage of data related to the system environment may include various databases such as historical database 320, policy database 322, learned data storage 324, and device database 326.

The historical database 320 is used to store information regarding past interactions (e.g., account actions, transactions, communications, inputs) and/or content of a past data stream. In some embodiments, the historical database 320 may be configured to store data from an incoming data stream in real-time. In some embodiments, the policy database 322 is configured to store pre-determined policies, conditions, rules, thresholds, user characteristic data, or the like for evaluating and managing the lookback detection system 130 (e.g., model configurations or thresholds, user preferences, and model adaptations, or the like). The policy database 322 may further be configured to store learned policies, conditions, rules, thresholds, or the like as determined in real-time by the machine learning models of the system described herein. In some embodiments, the policy database 322 is further configured to store metrics, system performance metrics, cost metrics, benefit metrics, cost-change metrics, adversarial scenarios or data, extrapolated scenarios or data, or the like, associated with the lookback detection system 130. In some embodiments, the policy database 322 and/or the historical database 320 include pre-existing training data for training a machine learning or artificial intelligence engine. In some embodiments, the policy database 322 is configured for storing settings associated with the system itself such as energy efficiency settings, computer resource use efficiency settings, response time settings, or the like.

The learned data storage 324 is configured to store data generated by the system (e.g., via decision engine 312, pattern extraction engine 314, artificial intelligence and neural network engine 316, or the like). The data stored in the learned data storage 324 may be used for training a machine learning model or artificial intelligence engine, and may also be combined with historical data or user interaction data in order to create user characteristic data. The learned data storage 324 may include adversarial or extrapolated scenarios or data generated by the systems described herein which may be fed back into artificial intelligence and neural network learning engines 316 to train the lookback detection system 130. In some embodiments, the lookback detection system 130 may include an adversarial function configured for providing adversarial learning and modeling to the system by introducing unreliable or erroneous data to the system; a learning or adaptation function for defining system response to data changes or an adaptation rate for implementing changes (i.e., model reconfiguration) within an architecture of the systems described herein; and an alertness function and robustness function for defining an appropriate system reaction, response, or extent of system reaction based on one or more environmental conditions or previous interactions. In some embodiments, various synthetic or system generated data may be injected in an outgoing data stream in real-time and over multiple iterations in order to further aid in identifying patterns by analyzing the various responses received in correspondence to the synthetic or system generated data. The artificial intelligence and neural network engines 316 described herein may include engines and/or models directed to, for example, cybersecurity, misappropriation detection, transaction pattern recognition and comparison, statistical anomaly detection, or the like.

The device database 326 is configured for storing received or generated device data used by the lookback detection system 130. The artificial intelligence and neural network engines 316 described herein generate enriched device data (e.g., may embed various metadata within the device data for enhanced system processing, may convert the device data into one or more file types to enhance storage or processing, or the like) that can then be analyzed by the lookback detection system 130 to determine high-confidence matching of device identities and verification for the completion of one or more user activities, such as the completion or attempted completion of various resource activities. It is understood that in some embodiments the identification or matching of user identities may be achieved in an anonymized or genericized fashion. For instance, in some embodiments, the lookback detection system 130 may not rely on matching a known user or customer with device data in order to verify an exact user identity. Rather, the lookback detection system 130 may simply recognize that device data, network data, or biometric data, may indicate a "user 1" for instance, and may discern that a different set of data signifies a "user 2," and so on. In this way, the lookback detection system 130 may simply track the number of unique users or user devices identified as accessing a given account during a given time period. Such generated device data is stored in the device database 326, and may be encrypted, genericized, and/or further anonymized for added security. In one embodiment, the imaging database 326 is configured to store a collection of image data collected by the entity system 120 or third party systems 140 in order to provide the lookback detection system 130 with a large amount of device data that allows the lookback detection system 130 a high level of adaptability to constantly changing environments or a wide array of various conditions and user characteristics, as may be reflected in changes in a received data stream in real time during implementation of the lookback detection system 130.

In one embodiment of the invention, the lookback detection system 130 may associate with applications having computer-executable program code that instructs the processing device 304 to perform certain functions described herein. In one embodiment, the computer-executable program code of an application associated with the user device 110 and/or the entity system 120 may also instruct the processing device 304 to perform certain logic, data processing, and data storing functions of the application. In one embodiment, the lookback detection system 130 further comprises a dynamic optimization algorithm to be executed by the processing device 304 or a controller 301 for reconfiguring a neural network learning model based on, for example, analyzed performance metrics. That said, the algorithm may further include a data pattern of a streamed data source, a data output from one or more models, or the like during an assessment of a new model reconfiguration. In some embodiments, a dynamic optimization algorithm may further receive the data stream and identified changes to the data stream in real-time for determining any reconfigurations.

In non-limiting embodiments, the data stream includes such as system hardware information (e.g., hardware energy usage) or other non-financial authentication information data (e.g., cybersecurity). In still other embodiments, the data stream may contain data collected by a security system for detecting intrusion (e.g., video monitoring, motion detecting, or the like). In other non-limiting examples of data monitored within the data stream include information regarding past, current, or scheduled transactions or other financial data associated with the user. Transaction information may include transaction amounts, payor and/or payee information, transaction dates and times, transaction locations, transaction volumes over a time period, transaction frequencies over a time period, or the like. In some embodiments, data may include information regarding account usage. For example, the data stream may include information regarding usage of a monetary account such as locations or time periods where the account was accessed, or the specific device address or virtual machine identity used in accessing the account. In another example, the data may further include merchants with whom the user frequently interacts, or a service representative whom the user interacted with in the past. In some embodiments, the data stream may contain information regarding characteristics of the data itself which may be monitored by the system. For example, the data stream may contain information regarding the quality of the data (e.g., file size, bit rate of stream), the fidelity of the data (i.e., data accuracy), mutability of the data stream (i.e., how quickly a data pattern in the data stream changes).

The system receives the streaming data where the data is then analyzed and processed by one or more artificial intelligence and neural network engines or models for decisioning purposes. Models, individually and/or structured as clusters, may be trained based on predetermined training data and/or new data acquired in real-time (i.e., from the data stream), wherein the system learns from the data by dynamically identifying patterns as the information is received and processed. In some embodiments of the present invention, models may be adaptive, wherein the models may be reconfigured based on different environmental conditions and/or an analysis and evaluation of the individual model performance. The model may be modified by the system by having one or more individual models and/or clusters added, removed, made inactive, or the like. In another example, the system may weight particular the conclusions of particular models and/or model clusters more than others based on rated accuracy of verification ability. Population architecture refers to a collection and particular arrangement of active models and/or clusters of models that are configured to process information mathematically or computationally to make decisions. Particular models and/or clusters may be weighted by the system to emphasize the impact or contribution of the particular models and/or clusters over others. Embodiments of the lookback detection system 130 may include multiple systems, servers, computers or the like maintained by one or many entities. In some embodiments, the lookback detection system 130 may be part of the entity system 120. In other embodiments, the entity system 120 is distinct from the lookback detection system 130. The lookback detection system 130 may communicate with the entity system 120 via a secure connection generated for secure encrypted communications between the two systems either over the network 101 or alternative to the network 101.

FIG. 4 provides a high level process flow for data processing and anomaly identification, in accordance with one embodiment of the invention. As shown in block 402, lookback detection system 130 receives transaction data and user device data from one or more entity system(s) 120. It is understood that in some embodiments, the lookback detection system 130 may receive additional data from one or more third party systems 140. In some instances, the lookback detection system 130 may be a part of the entity systems 120, and therefore may receive transaction data and user device data directly during user interaction with the entity systems 120 via the user application 238. One or more channels of communication may be used to transmit data to the lookback detection system 130, such as via a web portal, user application 238, local area network, resource transaction rail (e.g., automated clearing house (ACH), real time payment, or the like), or the like. As shown in block 404, the lookback detection system 130 may identify one or more unique user devices from the device data. For instance, in the course of interacting with lookback detection system 130 or entity system 120, as user may use a user device 110. The network traffic transmitted to the lookback detection system 130 or entity system 120 can be dissected and analyzed to determine, based on the packet extension header information, a source address such as an IP address, or a unique device identifier, such as a MAC address. In other embodiments, the user device data may also include information on the particular channel or application for each mode of communication or interaction with the lookback detection system 130 or entity system 120. For instance, network traffic may include a particular application source (e.g., allowing the system to detect a log-in via the user application 238 on a specific mobile device operating system, or the like), or may include a particular browser source (e.g., allowing the system to detect a log-in or account access via a web portal using a particular browser, operating system, or the like). Other device data characteristics included or determinable based on network traffic may include geographic location, time of day, date, or the like. It is understood that all of these data points and similar data points may be identified or extrapolated by the lookback detection system 130 in order for more accurate pattern analysis and baseline pattern generation.

As shown in block 406, the lookback detection system 130 may generate baseline transaction and device pattern data and append one or more resource account identifier values to the baseline transaction and device pattern data (e.g., append metadata labeling to the collected data in order to provide a cross reference of particular network traffic with one or more particular resource accounts, or the like). In some embodiments, the system may track which device identifiers, communication channels, resource actions, resource transaction amounts, transaction volume, transaction frequency, and the like in order to discern a typical pattern of interaction associated with the resource account over time. The lookback detection system 130 may additionally weight the baseline transaction and device pattern data according to what the lookback detection system 130 observes as most commonly occurring, and may readjust the weight of each datapoint accordingly.

Moving to block 408, after the baseline is generated, the lookback detection system 130 may receive additional transaction data and additional user device data in the same manner as described above. This additional transaction data and additional user device data is then compared to the baseline transaction and device pattern data, as shown in block 410. In some instances, the lookback detection system 130 may identify one or more new user devices not present in the baseline data, as shown in block 412. The identification of a new user device accessing a resource account may be one instance of an anomaly. The new user device is "new" in the sense that it is identified as accessing one or more particular resource accounts for the first time. As discussed with regard to FIG. 5, other anomalies may be detectable following a historical review of the new user device's other interactions. At this stage, the lookback detection system 130 may initiate historical analysis of stored data to determine all interactions between the new user device and one or more entity systems, which may implicate multiple resource accounts.

FIG. 5 provides a high level process flow for data processing, historical analysis, and response, in accordance with one embodiment of the invention. As shown in block 502, the process begins by the lookback detection system 130 identifying an anomaly or receiving an alert of an anomaly associated with a specific user device. While the anomaly described in FIG. 4 particularly relates to a "new" user device accessing a resource account, where the new user device is not present in the baseline data generated for that particular resource account, other anomalies may be identified or notified to the lookback detection system 130. For instance, lookback detection system 130, the entity system 120 or third party systems 140 may identify that a particular user device is accessing multiple separate resource accounts which may be owned, controlled, or authorized for access by disparate users or groups of users. In such embodiments, further investigation may be warranted to determine what other instances may exist where the device was used to interact with the lookback detection system 130, entity system 120, or third party system 140.

As shown in block 504, the lookback detection system 130 may retrieve historical interaction data from one or more entity systems 120 or third party systems 140. In embodiments where the lookback detection system 130 is an integral part of the entity systems 120, the lookback detection system 130 may already possess historical interaction data in the historical database 320, and may retrieve the data from this location. Using the device identifier of the specific user device, the lookback detection system 130 may analyze the historical interaction data to identify all interactions involving the device identifier matching the specific user device, as shown in block 506. Based on the identified interactions, the lookback detection system 130 determines if the specific user device activity appears to be malfeasant, as shown in block 508. Instances where the specific user device activity may appear malfeasant include certain anomalous pattern characteristics such as large transaction requests, withdrawals, or the like, access or attempted access to multiple disparate resource accounts, location data not associated with the baseline for one or more resource accounts, identified use of an IP address known to be associated with a virtual private network (VPN) service, or the like.

Once a potentially malfeasant interaction has been identified, the lookback detection system 130 identifies one or more affected resource accounts or users, as shown in block 510. For instance, if the specific user device is observed as attempting to gain access to multiple resource accounts, the resource account identifiers for those accounts are collected, and the owners, authorized parties, or the like are identified. The lookback detection system 130 may then generate a report including identified malfeasant activity, or activity which appears to be anomalous or malfeasant, as well as the affected accounts or users. In some instances, the contact information for the affected accounts or users may also be available in the historical database As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with collaborative machine learning and population reconfiguration.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for state-based learning and neural network reconfiguration, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system providing automated user device activity analysis, the system comprising:
   a module containing a memory storage device, a communication device, and a processor, with computer-readable program code stored thereon, wherein executing the computer-readable program code is configured to cause the processor to:
   identify a data anomaly associated with a specific user device and specific resource account;
   retrieve historical interaction data from one or more entity or third party systems;
   based on the historical interaction data, identify one or more interactions involving the specific user device;
   determine if the one or more interactions involving the specific user device is malfeasant activity, further comprising:
   generate baseline transaction and device pattern data based on device identifiers, communication channels, resource actions, resource transaction amounts, transaction volume, and transaction frequency;
   weight the device identifiers, the communication channels, the resource actions, the resource transaction amounts, the transaction volume, and the transaction frequency according to a frequency of each datapoint;
   compare additional transaction data and additional user device data from the one or more interactions involving the specific user device to the baseline transaction and the device pattern data;
   identify the malfeasant activity based on the additional transaction data and the additional user device data not matching the baseline transaction and the device pattern data; and
   identify one or more resource accounts affected by the malfeasant activity, wherein identifying the one or more resource accounts affected by the malfeasant activity further comprises analyzing the historical interaction data to determine one or more access attempts to disparate resource accounts from the specific user device.

2. The system of claim 1, further configured to generate a report file, wherein the report file comprises the malfeasant activity and affected accounts or users.

3. The system of claim 2, further configured to transmit an alert to one or more users or administrators, wherein the alert contains the report file.

4. The system of claim 1, further configured to initiate automated restriction of access to the one or more entity or third party systems by the specific user device.

5. The system of claim 1, wherein identifying the data anomaly associated with the specific user device and the specific resource account further comprises:

receive transaction data and user device data from the one or more entity or third party systems;
identify one or more unique user devices from the user device data;
generate the baseline transaction and the device pattern data by appending a resource account identifier value to the baseline transaction and the device pattern data;
compare the additional transaction data and the additional user device data to the baseline transaction and the device pattern data; and
based on comparing the additional transaction data and the additional user device data to the baseline transaction and the device pattern data, identify one or more new user devices, and label the one or more new user devices as the data anomaly.

6. The system of claim 5, wherein the baseline transaction and the device pattern data further comprises volume and frequency of interactions between one or more user devices and resource accounts.

7. The system of claim 5, wherein the one or more new user devices are identified as accessing the one or more resource accounts for a first time.

8. A computer-implemented method providing automated user device activity analysis, the computer-implemented method comprising:
identifying a data anomaly associated with a specific user device and specific resource account;
retrieving historical interaction data from one or more entity or third party systems;
based on the historical interaction data, identifying one or more interactions involving the specific user device;
determining if the one or more interactions involving the specific user device is malfeasant activity, further comprising:
generating baseline transaction and device pattern data based on device identifiers, communication channels, resource actions, resource transaction amounts, transaction volume, and transaction frequency;
weighting the device identifiers, the communication channels, the resource actions, the resource transaction amounts, the transaction volume, and the transaction frequency according to a frequency of each datapoint;
comparing additional transaction data and additional user device data from the one or more interactions involving the specific user device to the baseline transaction and the device pattern data;
identifying the malfeasant activity based on the additional transaction data and the additional user device data not matching the baseline transaction and the device pattern data; and
identifying one or more resource accounts affected by the malfeasant activity, wherein identifying the one or more resource accounts affected by the malfeasant activity further comprises analyzing the historical interaction data to determine one or more access attempts to disparate resource accounts from the specific user device.

9. The computer-implemented method of claim 8, further comprising generating a report file, wherein the report file comprises the malfeasant activity and affected accounts or users.

10. The computer-implemented method of claim 9, further comprising transmitting an alert to one or more users or administrators, wherein the alert contains the report file.

11. The computer-implemented method of claim 8, further comprising initiating automated restriction of access to the one or more entity or third party systems by the specific user device.

12. The computer-implemented method of claim 8, wherein identifying the data anomaly associated with the specific user device and the specific resource account further comprises:
receiving transaction data and user device data from the one or more entity or third party systems;
identifying one or more unique user devices from the user device data;
generating the baseline transaction and the device pattern data by appending a resource account identifier value to the baseline transaction and the device pattern data;
comparing the additional transaction data and the additional user device data to the baseline transaction and the device pattern data; and
based on comparing the additional transaction data and the additional user device data to the baseline transaction and the device pattern data, identifying one or more new user devices, and label the one or more new user devices as the data anomaly.

13. The computer-implemented method of claim 12, wherein the baseline transaction and the device pattern data further comprises volume and frequency of interactions between one or more user devices and resource accounts.

14. The computer-implemented method of claim 12, wherein the one or more new user devices are identified as accessing the one or more resource accounts for a first time.

15. A computer program product providing automated user device activity analysis, the computer program product comprising at least one non-transitory computer-readable medium having computer-readable program code portions embodied therein, the computer-readable program code portions comprising:
an executable portion configured for identifying a data anomaly associated with a specific user device and specific resource account;
an executable portion configured for retrieving historical interaction data from one or more entity or third party systems;
an executable portion configured for, based on the historical interaction data, identifying one or more interactions involving the specific user device;
an executable portion configured for determining if the one or more interactions involving the specific user device is malfeasant activity, further comprising:
generating baseline transaction and device pattern data based on device identifiers, communication channels, resource actions, resource transaction amounts, transaction volume, and transaction frequency;
weighting the device identifiers, the communication channels, the resource actions, the resource transaction amounts, the transaction volume, and the transaction frequency according to a frequency of each datapoint;
comparing additional transaction data and additional user device data from the one or more interactions involving the specific user device to the baseline transaction and the device pattern data;
identifying the malfeasant activity based on the additional transaction data and the additional user device data not matching the baseline transaction and the device pattern data; and
an executable portion configured for identifying one or more resource accounts affected by the malfeasant activity, wherein identifying the one or more resource accounts affected by the malfeasant activity further comprises analyzing the historical interaction data to determine one or more access attempts to disparate resource accounts from the specific user device.

16. The computer program product of claim 15, further comprising an executable portion configured for generating a report file, wherein the report file comprises the malfeasant activity and affected accounts or users.

17. The computer program product of claim 16, further comprising an executable portion configured for transmitting an alert to one or more users or administrators, wherein the alert contains the report file.

18. The computer program product of claim 15, further comprising an executable portion configured for initiating automated restriction of access to the one or more entity or third party systems by the specific user device.

19. The computer program product of claim 15, wherein identifying the data anomaly associated with the specific user device and the specific resource account further comprises:

receiving transaction data and user device data from the one or more entity or third party systems;
identifying one or more unique user devices from the user device data;
generating the baseline transaction and the device pattern data by appending a resource account identifier value to the baseline transaction and the device pattern data;
comparing the additional transaction data and the additional user device data to the baseline transaction and the device pattern data; and
based on comparing the additional transaction data and the additional user device data to the baseline transaction and the device pattern data, identifying one or more new user devices, and label the one or more new user devices as the data anomaly.

20. The computer program product of claim 19, wherein the baseline transaction and the device pattern data further comprises volume and frequency of interactions between one or more user devices and resource accounts.

\* \* \* \* \*